United States Patent
Kurahashi

(10) Patent No.: US 8,235,606 B2
(45) Date of Patent: Aug. 7, 2012

(54) MIRROR UNIT AND IMAGE CAPTURING APPARATUS

(75) Inventor: Toshiaki Kurahashi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/158,076

(22) Filed: Jun. 10, 2011

(65) Prior Publication Data

US 2011/0236006 A1    Sep. 29, 2011

Related U.S. Application Data

(63) Continuation of application No. 12/656,314, filed on Jan. 25, 2010, now abandoned.

(51) Int. Cl.
G03B 19/12 (2006.01)
G03B 17/00 (2006.01)
G02B 7/182 (2006.01)
(52) U.S. Cl. .......... 396/358; 396/447; 359/873
(58) Field of Classification Search .......... 396/117, 396/352, 358, 447; 359/872–877
See application file for complete search history.

(56) References Cited

U.S. PATENT DOCUMENTS 6,183,142 B1    2/2001  Sakamoto et al. ........... 396/358

OTHER PUBLICATIONS

U.S. Appl. No. 12/656,314, filed Jan. 25, 2010, Toshiaki Kurahashi, Nikon Corporation.
Office Action mailed from the United States Patent and Trademark Office on Dec. 10, 2010 in the related U.S. Appl. No. 12/656,314.

*Primary Examiner* — Rochelle-Ann J Blackman

(57) ABSTRACT

A mirror unit that can decrease the wait time before distance measurement. The mirror unit includes a first mirror; a second mirror; a first mirror holder that holds the first mirror, is rotatable on a rotational axis arranged above an optical path of the incident light, is lowered to a first mirror-down position, and is raised to a first mirror-up position; and a second mirror holder that includes an auxiliary component and a mirror holding component holding the second mirror, is lowered to a second mirror-down position, and is raised to a second mirror-up position, wherein the auxiliary component is provided below the first mirror holder in the direction of the lowering, is rotatable on a rotational axis that is the same as or parallel to the rotational axis of the first mirror holder, and can be lowered independently of the first mirror holder, and the mirror holding component is engaged with the auxiliary component to be relatively rotatable around a rotational axis that is parallel to the rotational axis of the auxiliary component.

6 Claims, 20 Drawing Sheets

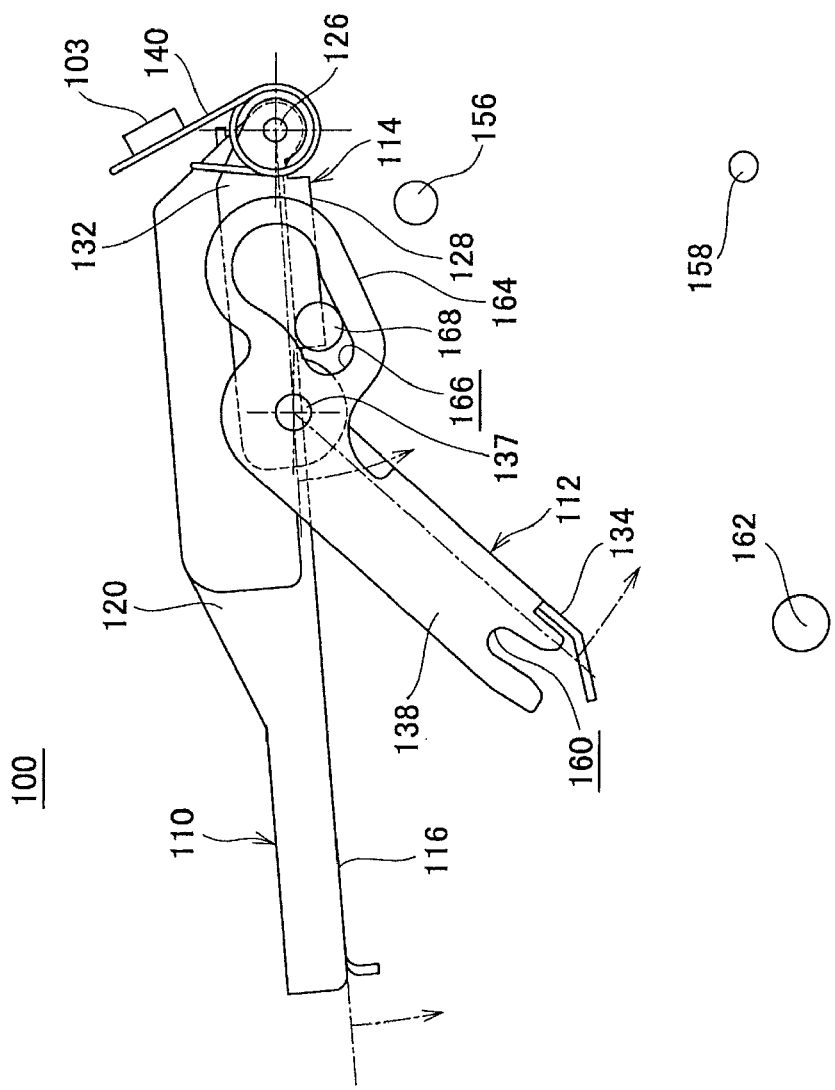
F I G. 9B

MIRROR UNIT AND IMAGE CAPTURING APPARATUS

CROSS-REFERENCE TO RELATED APPLICATIONS

This application is a continuation of and claims priority benefit to U.S. patent application Ser. No. 12/656,314, filed Jan. 25, 2010, pending, which application in turn is based upon and claims the benefit of priority under 35 U.S.C. §119 to Japanese Patent Application No. 2009-014052 filed on Jan. 26, 2009, the entire contents of which are incorporated herein by reference.

BACKGROUND

1. Technical Field

The present invention relates to a mirror unit and an image capturing apparatus.

2. Related Art

A known mirror unit for a single lens reflex camera includes a main mirror, which is a half mirror, and a sub-mirror that reflects the light passed by the main mirror downward to a distance measuring sensor, and these mirrors are lowered into the optical path or raised above the optical path, as shown in Japanese Patent Application Publications No. 62-78536 and No. 63-95430. In such a mirror unit, a sub-frame holding the sub-mirror hangs down to be rotatable relative to a main frame holding the main mirror.

To achieve accurate distance measurement, it is desirable that measurement be started after vibration of the lowered sub-mirror has stopped. However, in this mirror unit, the vibration of the sub-mirror does not stop until the vibration of the lowered main frame has stopped. In other words, initiation of distance measurement is delayed because of the vibration of the main frame.

SUMMARY

To solve this problem, a first aspect of the present invention provides a mirror unit comprising a first mirror (102) that reflects and passes incident light from a subject side; a second mirror (104) that reflects the incident light passed by the first mirror; a first mirror holder (110) that holds the first mirror, is rotatable on a rotational axis arranged above an optical path of the incident light, is lowered to a first mirror-down position in which the first mirror is inserted into the optical path of the incident light, and is raised to a first mirror-up position in which the first mirror is removed from the optical path of the incident light; and a second mirror holder that includes an auxiliary component (114) and a mirror holding component (112) holding the second mirror, is lowered to a second mirror-down position in which the second mirror is inserted into the optical path of the incident light, and is raised to a second mirror-up position in which the second mirror is removed from the optical path of the incident light, wherein the auxiliary component is provided below the first mirror holder in the direction of the lowering, is rotatable on a rotational axis that is the same as or parallel to the rotational axis of the first mirror holder, and can be lowered independently of the first mirror holder, and the mirror holding component is engaged with the auxiliary component to be relatively rotatable around a rotational axis that is parallel to the rotational axis of the auxiliary component.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 9B is a side view as seen from the left side of a photographer of the mirror unit 100 when a mirror-down operation is performed.

DESCRIPTION OF EXEMPLARY EMBODIMENTS

Hereinafter, some embodiments of the present invention will be described. The embodiments do not limit the invention according to the claims, and all the combinations of the features described in the embodiments are not necessarily essential to means provided by aspects of the invention.

Figure 1:
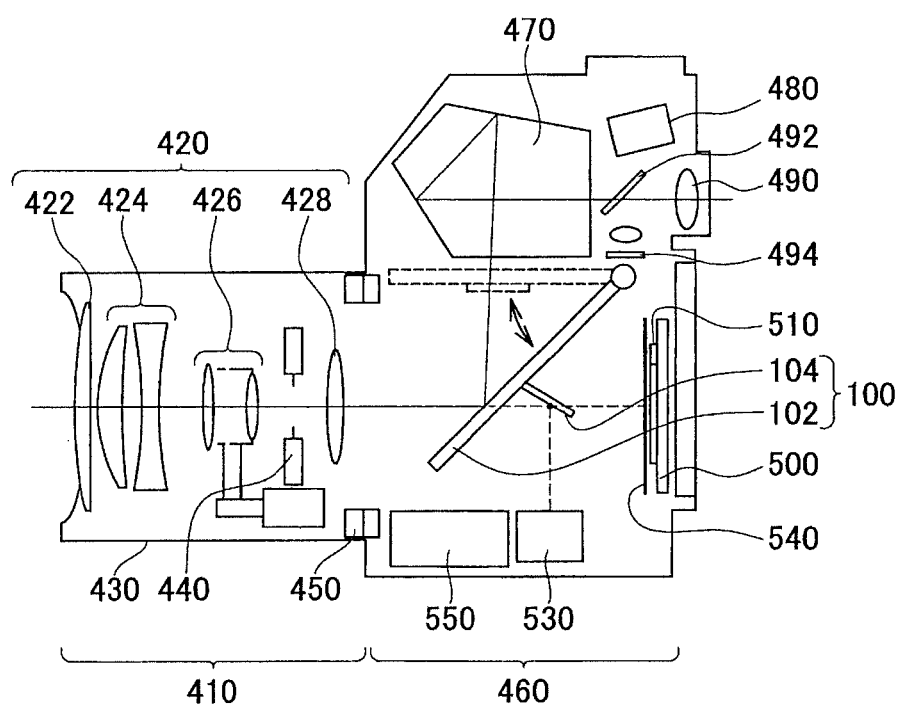
FIG. 1 is a schematic cross-sectional side view of a single lens reflex digital camera 101 provided with a mirror unit 100 according to an embodiment of the present invention.

FIG. 1 is a schematic cross-sectional side view of a single lens reflex digital camera 101 provided with a mirror unit 100 according to an embodiment of the present invention. As shown in FIG. 1, the digital camera 101 is provided with an optical component 420, a lens barrel 430, an image capturing unit 500 such as a CCD, and a control section 550. The lens barrel 430 houses the optical component 420. The image capturing unit 500 captures an image of a subject that is focused by the optical component 420. The control section 550 controls the image capturing unit 500.

The digital camera 101 includes a lens unit 410, which contains the optical component 420 and the lens barrel 430, and a body 460. The lens unit 410 is detachably mounted on the body 460 via a mount 450.

The optical component 420 contains, in order from an incident end that is the left side of FIG. 1, a front lens 422, a compensator lens 424, a focusing lens 426, and a main lens 428. An iris unit 440 is arranged between the focusing lens 426 and the main lens 428.

The body 460 houses an optical component that includes the mirror unit 100, a pentaprism 470, and an eyepiece system 490. The mirror unit 100 includes a main mirror 102, which is a half mirror for reflecting and passing incident light passed through the lens unit 410. The main mirror 102 moves between (i) a down position in which the main mirror 102 is arranged diagonally in the optical path of the incident light and (ii) an up position, shown by a dotted line in FIG. 1, in which the main mirror 102 is raised out of the optical path of the incident light.

When in the down position, the main mirror 102 guides a majority of the incident light to the pentaprism 470. The pentaprism 470 projects the reflection of the incident light toward the eyepiece system 490, and therefore the image of the focusing screen can be seen as a real image from the eyepiece system 490. The remaining incident light is guided to the light measuring unit 480 by the pentaprism 470. The light measuring unit 480 measures the intensity of the incident light, and a distribution or the like of this intensity.

A half mirror 492 is arranged between the pentaprism 470 and the eyepiece system 490 to superimpose a display image formed by a finder liquid crystal 494 onto the image of the focusing screen. The display image is displayed overlapping the image projected from the pentaprism 470.

The mirror unit 100 includes a sub-mirror 104 on a back side of the main mirror 102, which is the side of the main mirror 102 not facing the incident light. The sub-mirror 104 moves between (i) a down position in which the sub-mirror 104 is arranged diagonally in the optical path of the incident light and (ii) an up position, shown by the dotted line in FIG. 1, in which the sub-mirror 104 is raised out of the optical path of the incident light.

When in the down position, the sub-mirror 104 guides the incident light passed by the main mirror 102 to a distance measuring unit 530 arranged below the sub-mirror 104. In other words, when the main mirror 102 and the sub-mirror 104 are in the down position, the distance measuring unit 530 measures the distance to the subject. When the main mirror 102 is moved to the up position, the sub-mirror 104 also moves to the up position.

A focal plane shutter 540, a low-pass filter 510, and an image capturing unit 500 are arranged in the stated order behind the main mirror 102 in the direction of the incident light. When the focal plane shutter 540 is opened, the main mirror 102 and the sub-mirror 104 positioned immediately in front of the focal plane shutter 540 are moved to the up position, and so the incident light can enter directly into the image capturing unit 500. In this way, the image formed by the incident light is converted into an electric signal. As a result, the image capturing unit 500 can capture the image focused by the lens unit 410.

Figure 2:
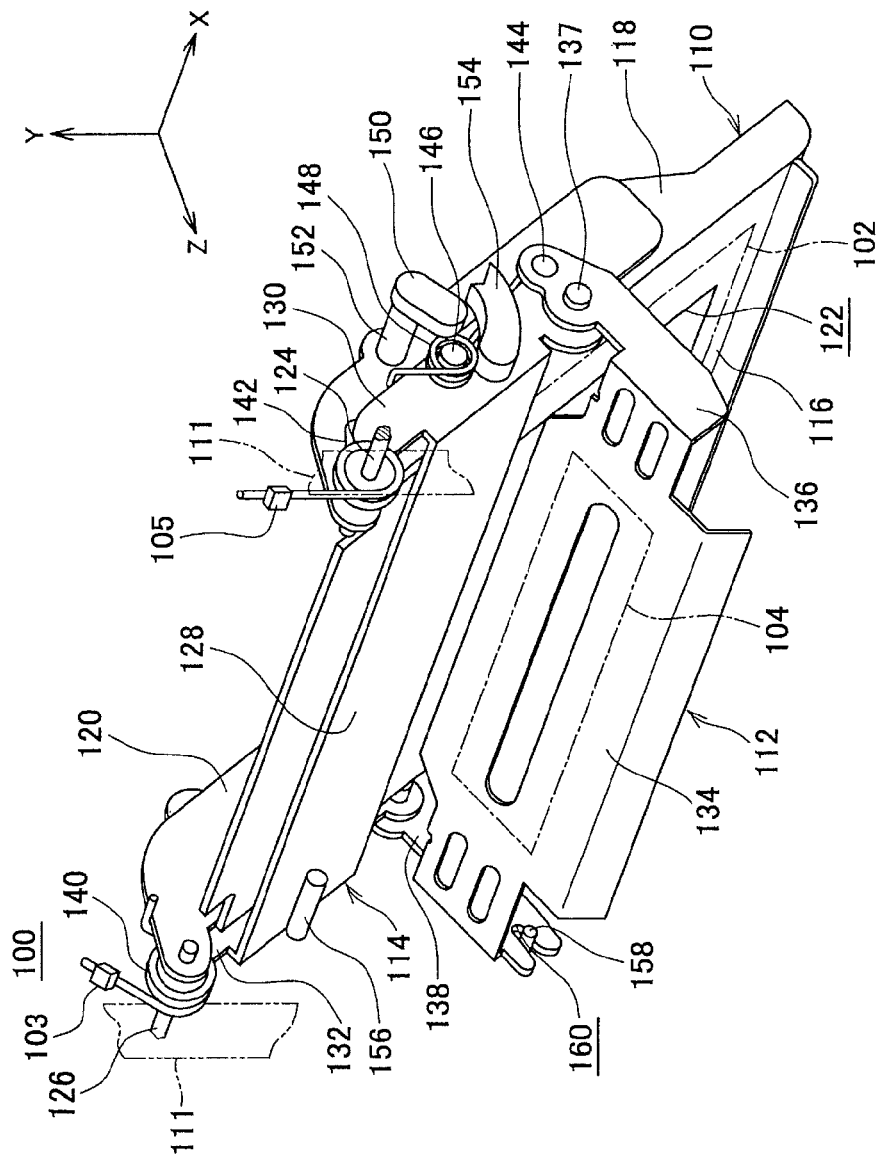
FIG. 2 is a schematic view as seen from the right side of a photographer of the mirror unit 100 in a mirror-down state

FIG. 2 is a schematic view as seen from the right side of a photographer of the mirror unit 100 in a mirror-down state. In FIG. 2, a direction to the right of the camera is represented by the arrow X, a direction upward from the camera is represented by the arrow Y, and the direction in which the incident light proceeds is represented by the arrow Z.

The mirror unit 100 is provided with a main frame 110 that holds the main mirror 102, a sub-frame 112 that holds the sub-mirror 104, and an auxiliary frame 114 that holds the sub-frame 112. The main frame 110 is provided with a rectangular base part 116 on which the main mirror 102 is mounted and side parts 118 and 120 that are provided on the left and right sides of the base part 116 and extend at substantially right angles therefrom to curve toward a subject side. The base part 116 has a rectangular aperture 122 that passes the incident light passed through the main mirror 102.

Circular holes are formed on the tips of the side parts 118 and 120 and shafts 124 and 126 are inserted into these holes to be relatively rotatable. The shafts 124 and 126 are arranged along an axis that runs crosswise in the camera and that is positioned above the optical path of the incident light, and are fixed on a unit frame 111. Therefore, the main frame 110 is supported in a manner to be rotatable on an axis positioned above the optical path of the incident light and extending crosswise in the camera.

The shaft 126 is inserted into a torsion coil spring 140 serving as a biasing member. The ends of the torsion coil spring 140 are locked respectively by an upper portion of the side part 120 and a locking part 103 formed on the unit frame 111. The ends of the torsion coil spring 140 can be elastically deformed in a direction to draw near each other, and the restorative force biases the side part 120 downward around the shaft 126. Accordingly, the main frame 110 is biased by the torsion coil spring 140 downward around the shafts 124 and 126.

The auxiliary frame 114 includes a rectangular base part 128 that is arranged lower than the base part 116 and has a length extending crosswise in the camera, and side parts 130 and 132 that are provided on the left and right sides of the base part 128 and extend at substantially right angles in a curving manner. The side parts 130 and 132 have lengths that extend along the width of the base part 128. One longitudinal end of the side part 130 has a circular hole into which the shaft 124 is inserted to be relatively rotatable, and one longitudinal end of the side part 132 has a circular hole into which the shaft 126 is inserted to be relatively rotatable. As a result, the auxiliary frame 114 can be supported in a manner to be rotatable relative to the unit frame 111 on an axis positioned above the optical path of the incident light and extending crosswise in the camera. Furthermore, the auxiliary frame 114 is supported to be rotatable with respect to the unit frame 111 on the same axis as the main frame 110.

The shaft 124 is inserted into a torsion coil spring 142 serving as a biasing member. The ends of the torsion coil spring 142 are locked respectively by an upper portion of the side part 130 and a locking part 105 formed on the unit frame 111. The ends of the torsion coil spring 142 can be elastically deformed in a direction to draw near each other, and the restorative force biases the side part 130 downward around the shaft 124. Accordingly, the auxiliary frame 114 is biased by the torsion coil spring 142 downward around the shafts 124 and 126.

The sub-frame 112 includes a rectangular base part 134 that has a length extending crosswise in the camera and on which is mounted the sub-mirror 104, and side parts 136 and 138 that are provided on the left and right sides of the base part 134 and extend at substantially right angles in to curve toward a subject side. The side parts 136 and 138 have lengths that extend along the width of the base part 134. One longitudinal end of the side part 136 is engaged with the side part 130 of the auxiliary frame 114 via a coupling axle 137 in a manner to be relatively rotatable, and one longitudinal end of the side part 138 is engaged with the side part 132 of the auxiliary frame 114 via the coupling axle 137 in a manner to be relatively rotatable.

One longitudinal end of the side part 136 has a boss 144 protruding towards the center of the camera in the crosswise direction. A longitudinal central portion of the side part 130 of the auxiliary frame 114 has a boss 146 that protrudes outward in the crosswise direction. The base end of the boss 146 is inserted into a toggle spring 148 serving as a biasing member. One end of the toggle spring 148 is locked by the side part 130, and the other end of the toggle spring 148 is locked by the boss 144. The ends of the toggle spring 148 can be elastically deformed in a direction to draw near each other, and the restorative force biases the side part 136 in the rotational direction of the coupling axle 137. The operation of the toggle spring 148 is described further below.

The side part 118 of the main frame 110 has a cam 150 mounted via an axle 152. The axle 152 is arranged in line with the boss 146 in the direction of rotation. The cam 150 is an elliptically shaped component, and one longitudinal end of the cam 150 is engaged with the axle 152. The other longitudinal end of the cam 150 is arranged to oppose the end surface of the boss 146.

A mirror-up lever 154 is arranged below the cam 150 and the boss 146. The mirror-up lever 154 pivots on a pivotal axis arranged toward the subject side and the bottom thereof to push up the cam 150 and the boss 146. A detailed description of this operation is described further below.

A positioning pin 156 is provided beneath the shaft 126 and below the auxiliary frame 114 in a direction in which the auxiliary frame 114 is lowered. The positioning pin 156 contacts the base part 128 when the auxiliary frame 114 is lowered. The down position of the auxiliary frame 114 is determined by the positioning pin 156 exerting pressure on the torsion coil spring 142.

A positioning pin 158 is arranged directly below the shaft 126. The other longitudinal end of the side part 138 of the sub-frame 112, i.e. the end on the outside of the rotational radial direction, has a U-shaped groove 160, and the positioning pin 158 engages with this U-shaped groove 160. The down position of the sub-frame 112 is determined by toggle spring 148 applying pressure to the positioning pin 158.

Here, the length of the auxiliary frame 114 from the shafts 124 and 126 to the outer end in the rotational radial direction is less than the length of the main frame 110 from the shafts 124 and 126 to the outer end in the rotational radial direction. In particular, in the mirror unit 100 of the present embodiment, the length of the auxiliary frame 114 from the shafts 124 and 126 to the outer end in the rotational radial direction is less than half of the length of the main frame 110 from the shafts 124 and 126 to the outer end in the rotational radial direction. As a result, the moment of inertia of the auxiliary frame 114 is less than the moment of inertia of the main frame 110.

The spring constants of the torsion coil springs 140 and 142 are set according to the difference in moment of inertia between the auxiliary frame 114 and the main frame 110, such that the auxiliary frame 114 is lowered faster than the main frame 110. For example, in the present embodiment, the moment of inertia of the main frame 110 is greater than that of the auxiliary frame 114, and so the spring constants of the torsion coil springs 140 and 142 are set to be the same, or are set such that the spring constant of the torsion coil spring 142 biasing the auxiliary frame 114 is greater than the spring constant of the torsion coil spring 140 biasing the main frame 110. Furthermore, the spring constant of the torsion coil spring 140 may be set greater than the spring constant of the torsion coil spring 142 as long as the lowering speed of the main frame 110 does not exceed the lowering speed of the auxiliary frame 114.

Figure 3:
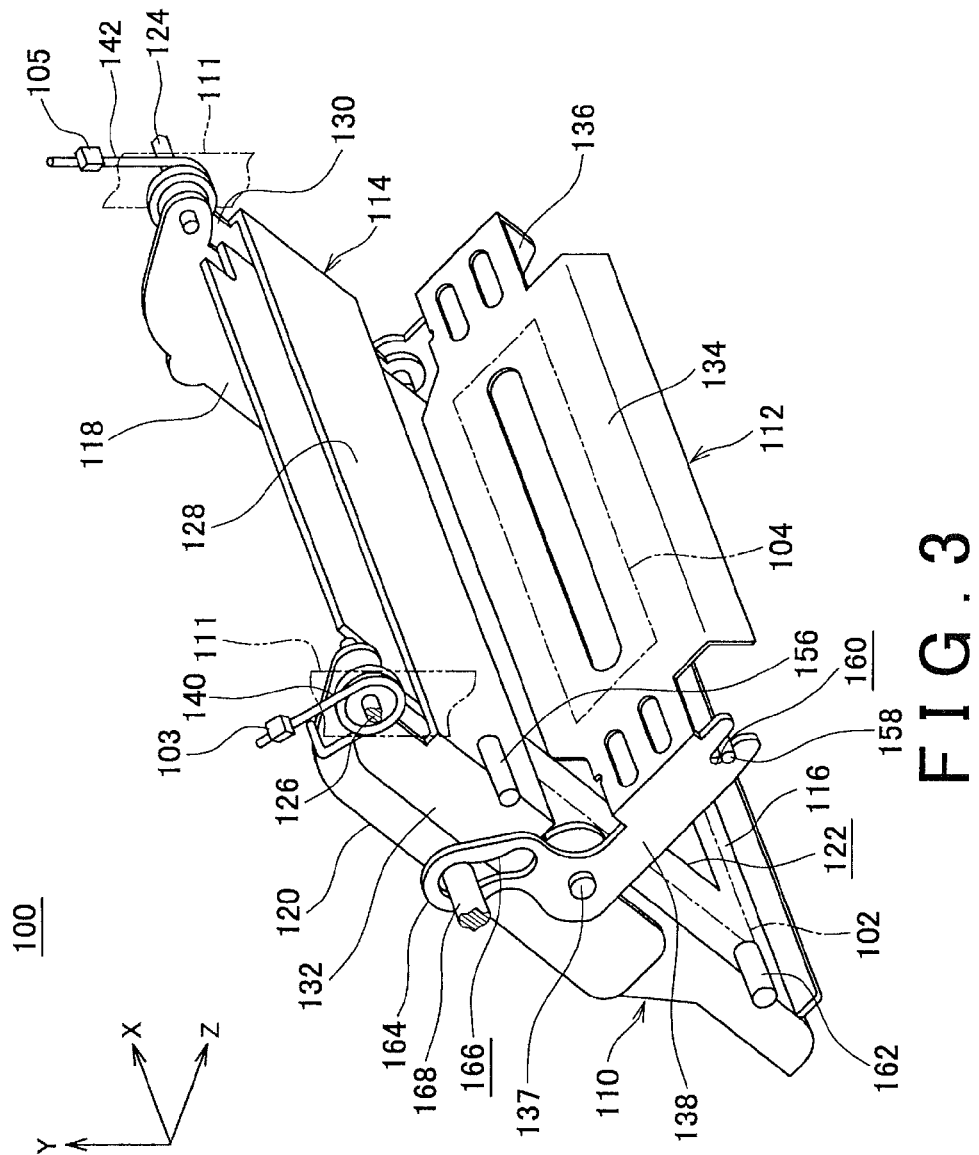
FIG. 3 is a schematic view as seen from the left side of a photographer of the mirror unit 100 in a mirror-down state.

FIG. 3 is a schematic view as seen from the left side of a photographer of the mirror unit 100 in a mirror-down state. As shown in FIG. 3, a positioning pin 162 is arranged beneath the shaft 124 and below the main frame 110 in the direction in which the main frame 110 is lowered. The positioning pin 162 contacts the base part 116 of the lowered main frame 110. The down position of the main frame 110 is determined by the torsion coil spring 140 exerting pressure on the positioning pin 162.

A cam 164 is provided on an upper end of the side part 138 of the sub-frame 112. A cam groove 166 is formed in the cam 164. The unit frame 111 has a cam pin 168 that protrudes to be inserted into the cam groove 166. The operation of the cam 164 and the cam pin 168 is explained in detail further below.

Figure 4A:
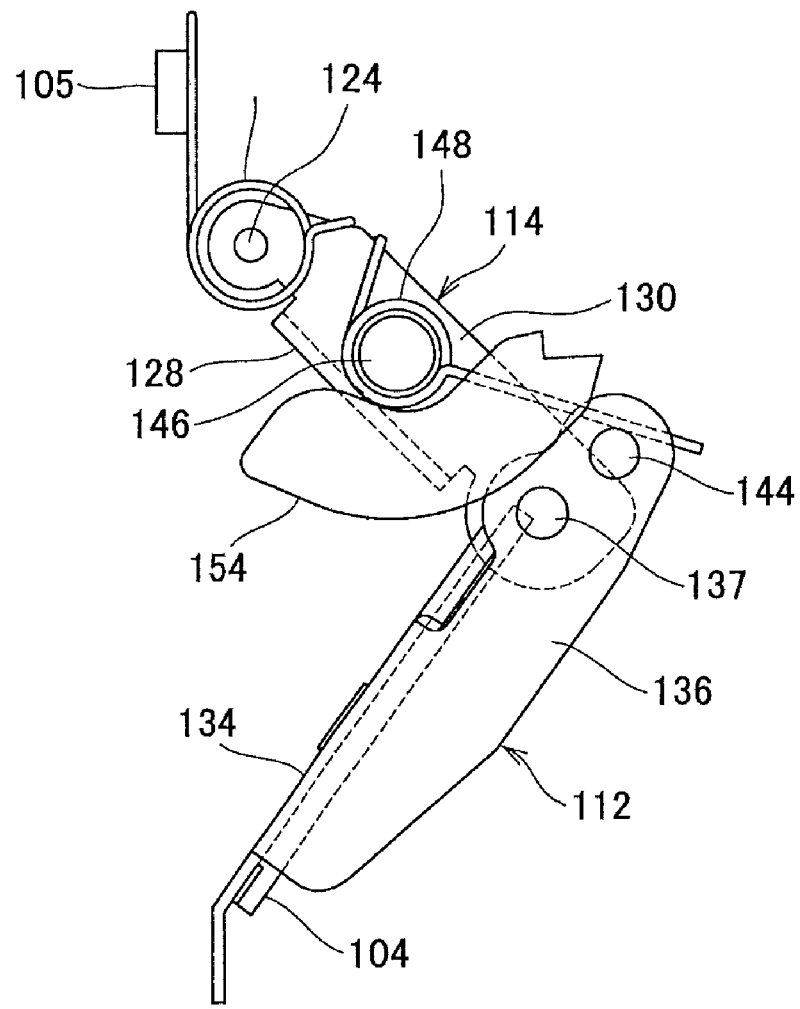
FIG. 4A is a schematic view as seen from the right side of a photographer of the auxiliary frame 114 and the sub-frame 112 in a mirror-down state.

FIG. 4A is a schematic view as seen from the right side of a photographer of the auxiliary frame 114 and the sub-frame 112 in a mirror-down state. As shown in FIG. 4A, the auxiliary frame 114 is suspended from the shafts 124 and 126 in a diagonal orientation relative to the subject side. The sub-frame 112 is suspended from the coupling axle 137 in a diagonal orientation relative to the imaging side.

Here, the auxiliary frame 114 is not engaged with the main frame 110, and the base part 128 of the auxiliary frame 114 is arranged below the base part 116 of the main frame 110. Therefore, when the auxiliary frame 114 is lowered to the down position, there is no interference with the main frame 110. Accordingly, the auxiliary frame 114 can be lowered to the down position independently from the main frame 110.

Figure 4B:
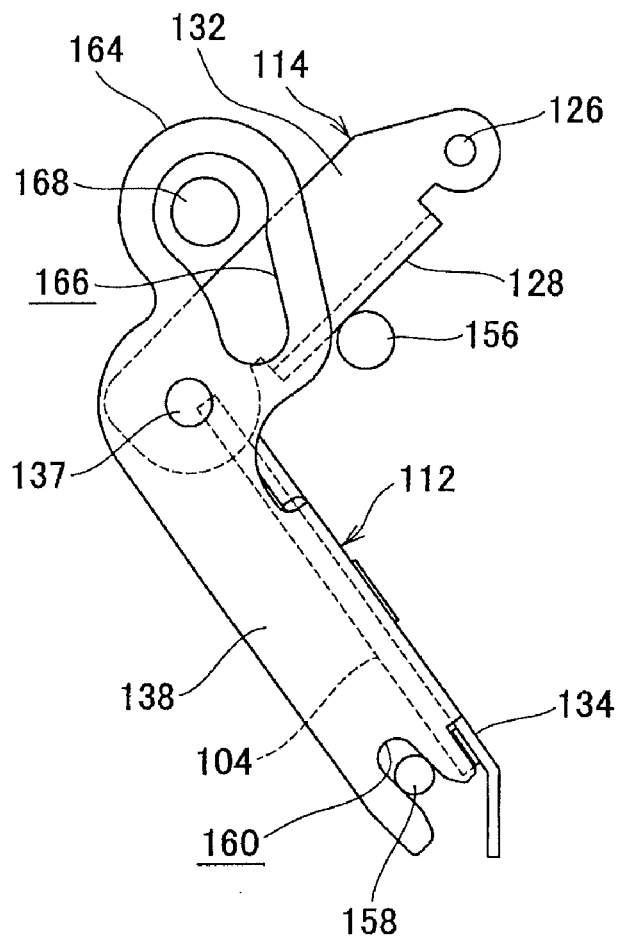
FIG. 4B is a schematic view as seen from the left side of a photographer of the auxiliary frame 114 and the sub-frame 112 in a mirror-down state.

FIG. 4B is a schematic view as seen from the left side of a photographer of the auxiliary frame 114 and the sub-frame 112 in a mirror-down state. As shown in FIG. 4B, the cam groove 166 of the cam 164 is formed on a free curve. The wall of the cam groove 166 contacts the cam pin 168 when the sub-frame 112 is raised from the down position to the up position, but the direction of the weight between the cam groove 166 and the cam pin 168 changes according to the angular position of the sub-frame 112.

Figure 5:
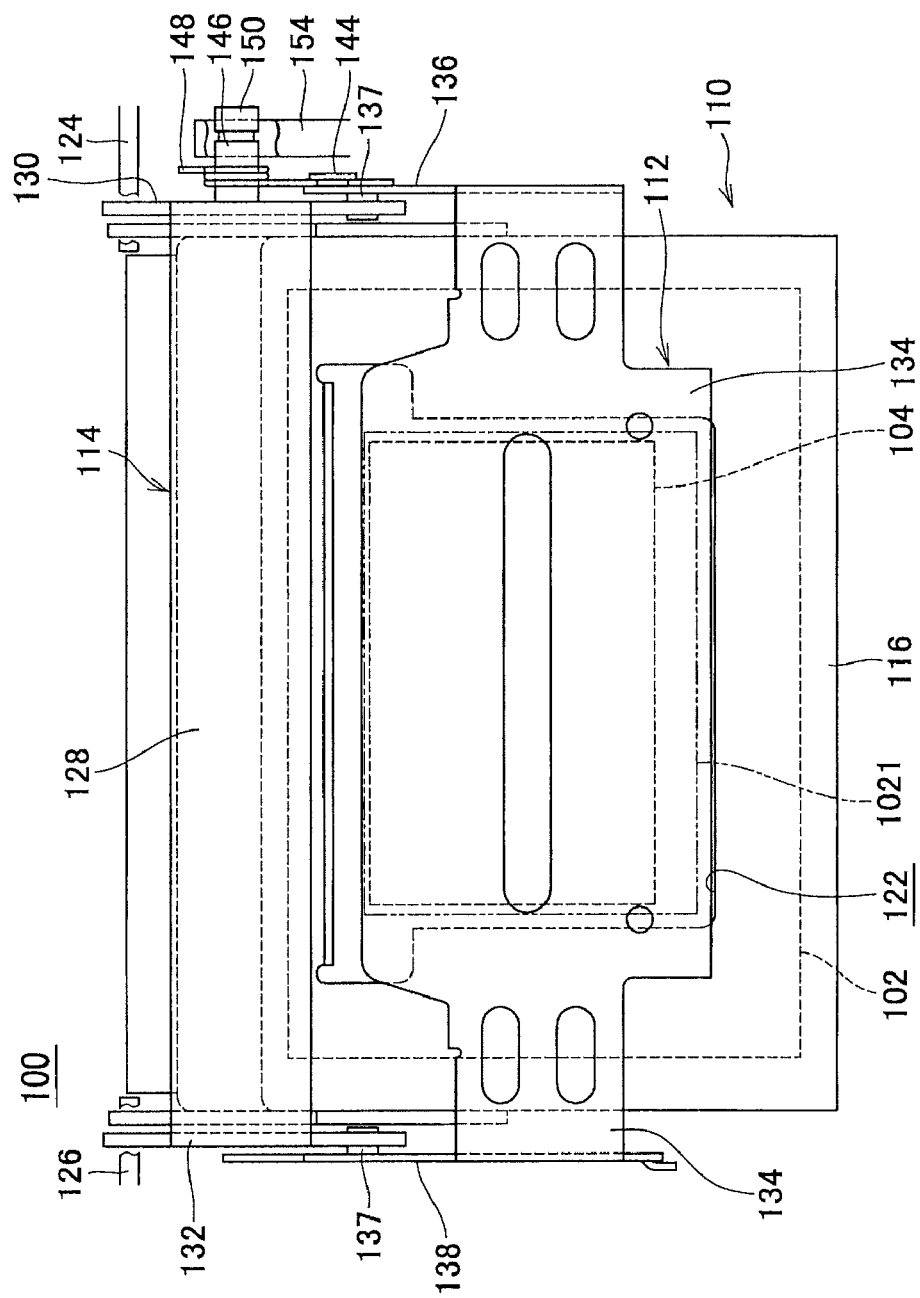
FIG. 5 is a plan view seen from below of the mirror unit 100 in a mirror-up state.

FIG. 5 is a plan view seen from below of the mirror unit 100 in a mirror-up state. As shown in FIG. 5, the aperture 122 formed in the base part 116 of the main frame 110 is blocked by the main mirror 102. However, a passing portion 1021 with an area smaller than that of the aperture 122 is formed in a region where the main mirror 102 overlaps the aperture 122. The periphery of the passing portion 1021 of the main mirror 102 is a light blocking region covered with an opaque material.

Here, the base part 134 of the sub-frame 112 has a greater area than the passing portion 1021, and the base part 134 overlaps with the entire area of the passing portion 1021 when viewed in an up and down direction.

As a result, with the main mirror 102 and the sub-mirror 104 in the up position, light is blocked from reaching the passing portion 1021 of the main mirror 102 by the sub-mirror 104 and the base part 134 of the sub-frame 112. Accordingly, the inverse incident light from the finder is prevented from leaking into the mirror box.

The following describes the operation of the mirror unit 100. In the following description, the rotation of the main frame 110, the sub-frame 112, and the auxiliary frame 114 from the down position to the up position is referred to as the "up direction" and the rotation of the main frame 110, the sub-frame 112, and the auxiliary frame 114 from the up position to the down position is referred to as the "down direction."

Figure 6A:
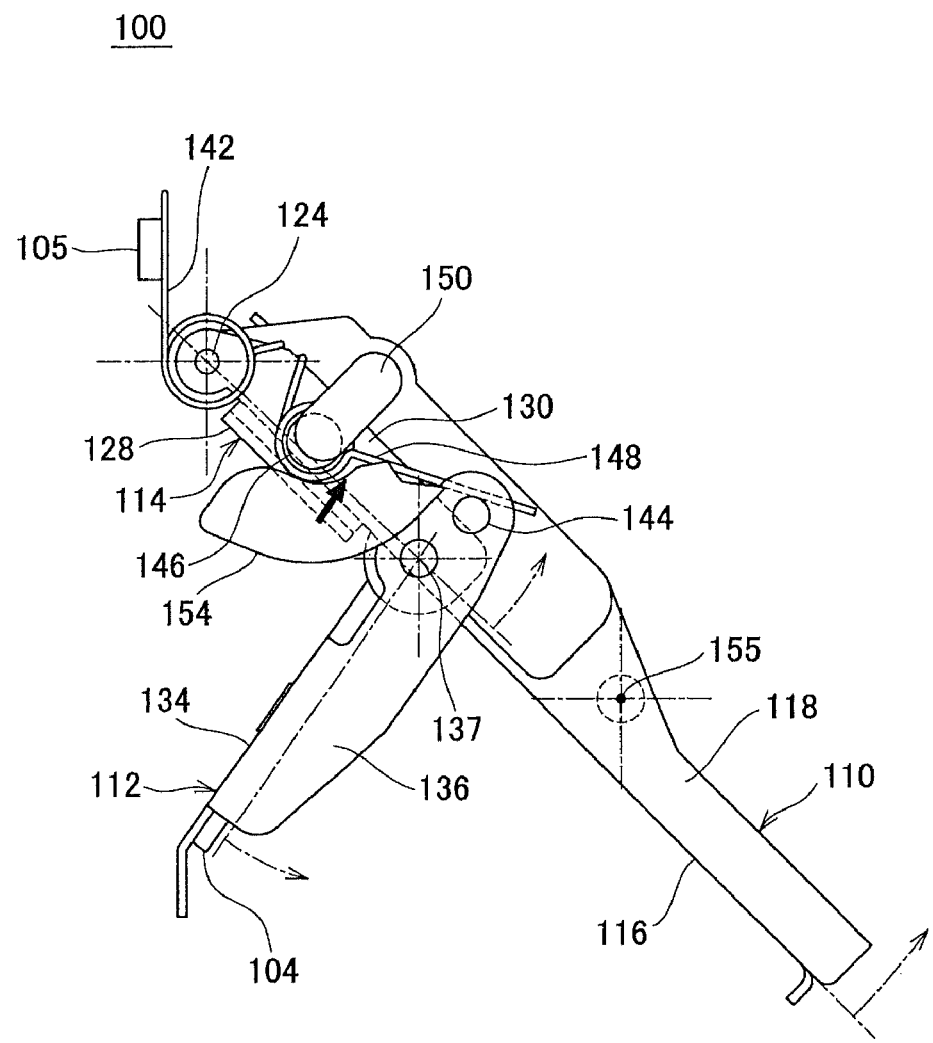
FIG. 6A is a side view as seen from the right side of a photographer of the mirror unit 100 in a mirror-down state.
Figure 6B:
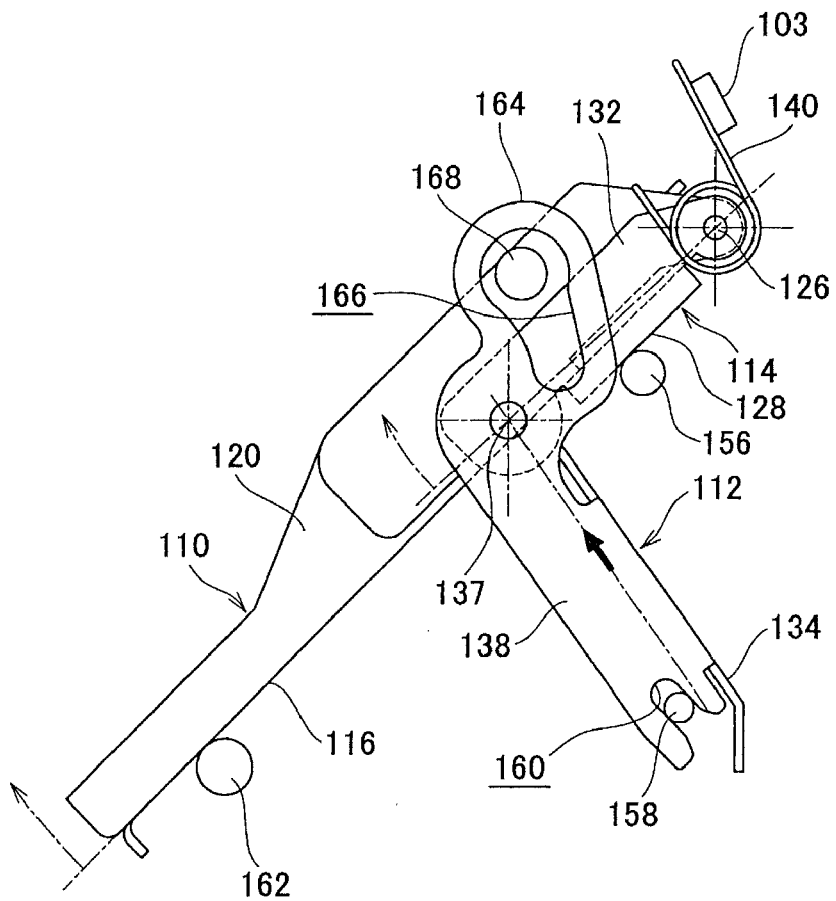
FIG. 6B is a side view as seen from the left side of a photographer of the mirror unit 100 in a mirror-down state.

FIG. 6A is a side view as seen from the right side of a photographer of the mirror unit 100 in a mirror-down state, and FIG. 6B is a side view as seen from the left side of a photographer of the mirror unit 100 in a mirror-down state. As shown in FIGS. 6A and 6B, by pressing a release switch, a drive motor of the mirror unit 100 is driven to pivot the mirror-up lever 154. The mirror-up lever 154 pivots around a pivot point 155 that is arranged downward and toward the subject side from the mirror-up lever 154. The mirror-up lever 154 pivots upward and toward the subject side around the pivot point 155.

With the main frame 110 and the auxiliary frame 114 in the down position, the mirror-up lever 154 does not contact the boss 146 or the cam 150. Furthermore, the wall of the cam groove 166 does not contact the cam pin 168.

Figure 7A:
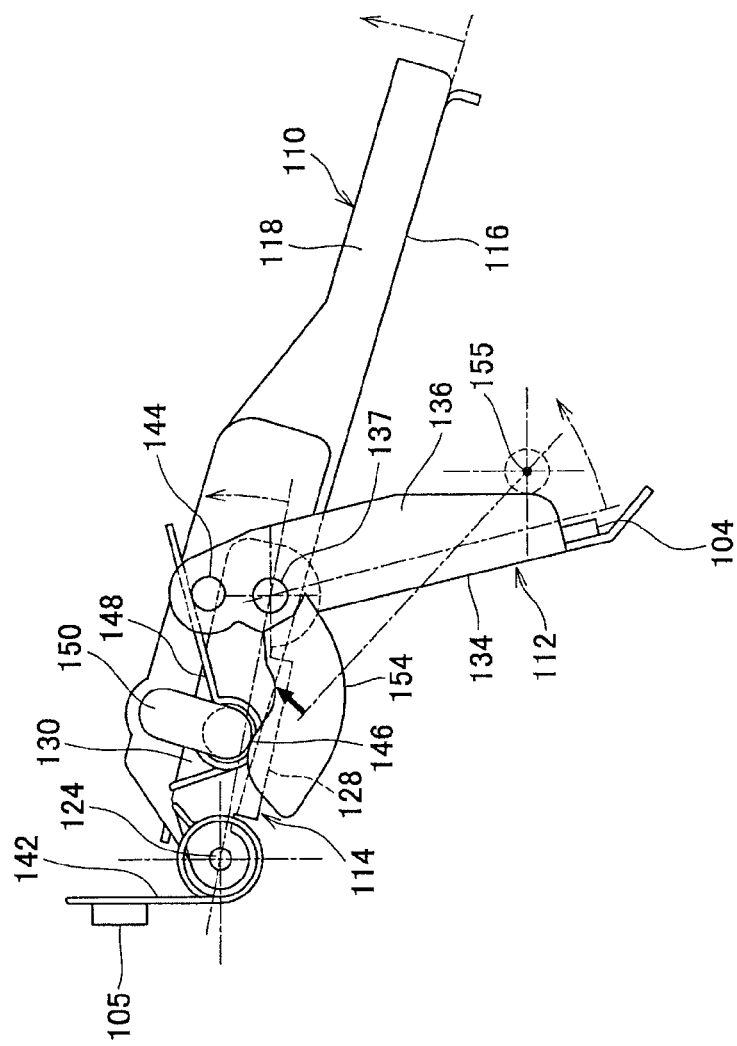
FIG. 7A is a side view as seen from the right side of a photographer of the mirror unit 100 when a mirror-up operation is performed.
Figure 7B:
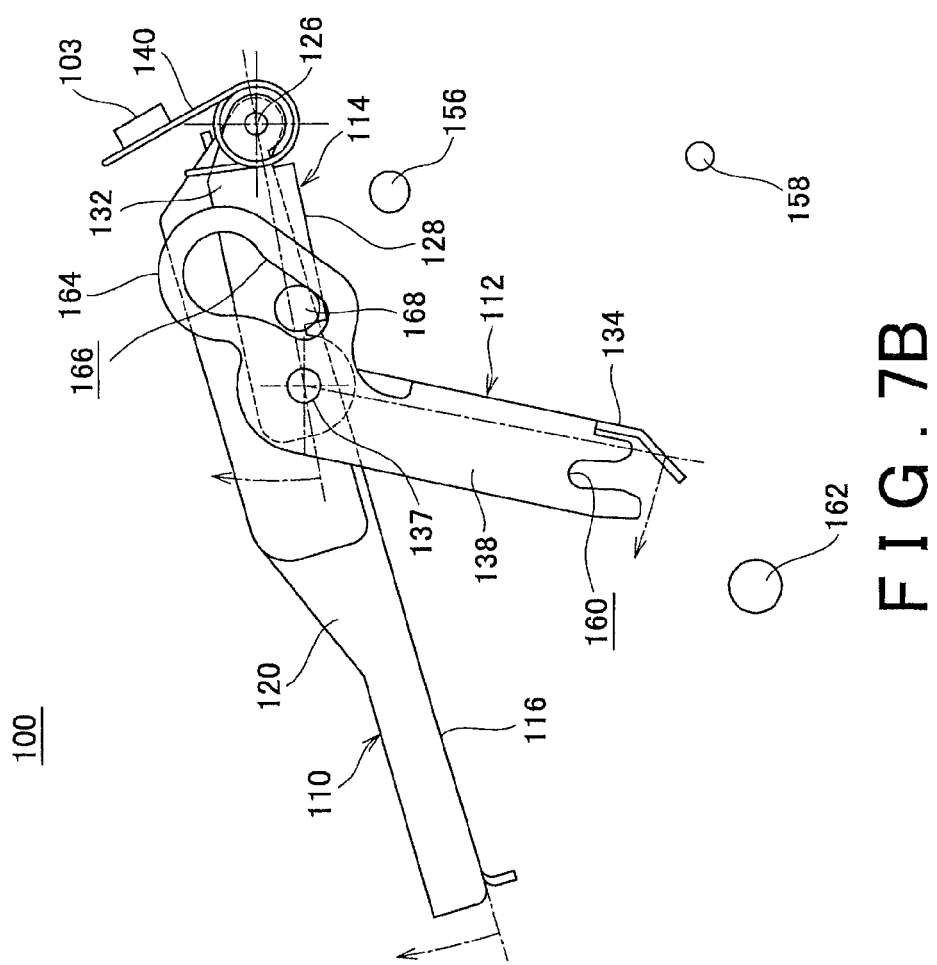
FIG. 7B is a side view as seen from the left side of a photographer of the mirror unit 100 when a mirror-up operation is performed.

FIG. 7A is a side view as seen from the right side of a photographer of the mirror unit 100 when a mirror-up operation is performed, and FIG. 7B is a side view as seen from the left side of a photographer of the mirror unit 100 when a mirror-up operation is performed. As shown in FIGS. 7A and 7B, when the mirror-up operation is begun for the mirror unit 100, the mirror-up lever 154 contacts the boss 146. The auxiliary frame 114 responds to the bias of the torsion coil spring 142 to rotate on the shafts 124 and 126 in the up direction. Next, the mirror-up lever 154 contacts the cam 150. The main frame 110 responds to the bias of the torsion coil spring 140 to rotate on the shafts 124 and 126 in the up direction.

At this time, the sub-frame 112 follows the auxiliary frame 114 to rotate on the shafts 124 and 126 in the up direction. In this state, the bias of the toggle spring 148 is exerted against the sub-frame 112 in the down direction around the coupling axle 137. Furthermore, the wall of the cam groove 166 contacts the cam pin 168, and the cam pin 168 exerts a counter force on the cam groove 166. This counter force is exerted on the cam 164 in the up direction around the coupling axle 137. Due to this counter force, the sub-frame 112 responds to the bias of the toggle spring 148 to rotate in the up direction on the coupling axle 137.

When the auxiliary frame 114 is raised further, the cam groove 166 and the cam pin 168 cause the sub-frame 112 to rotate in the up direction on the coupling axle 137. The bias direction of the toggle spring 148 changes to the up direction on the coupling axle 137. Therefore, the sub-frame 112 responds to the bias of the toggle spring 148 to rotate in the up direction on the coupling axle 137.

Figure 8A:
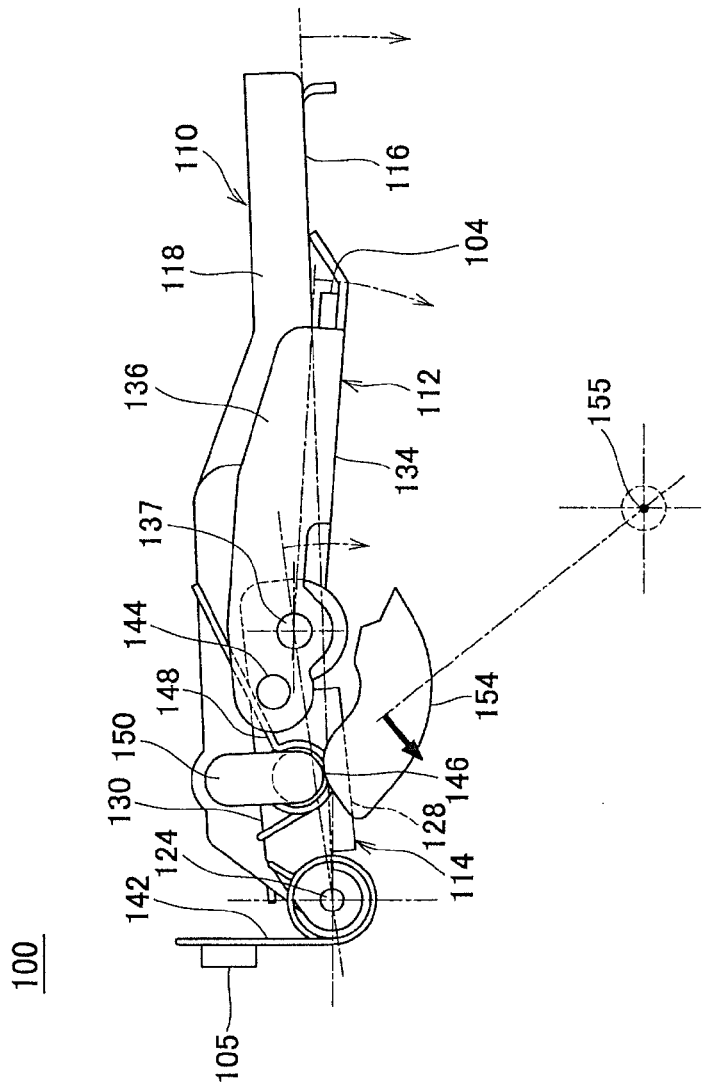
FIG. 8A is a side view as seen from the right side of a photographer of the mirror unit 100 in the mirror-up state.
Figure 8B:
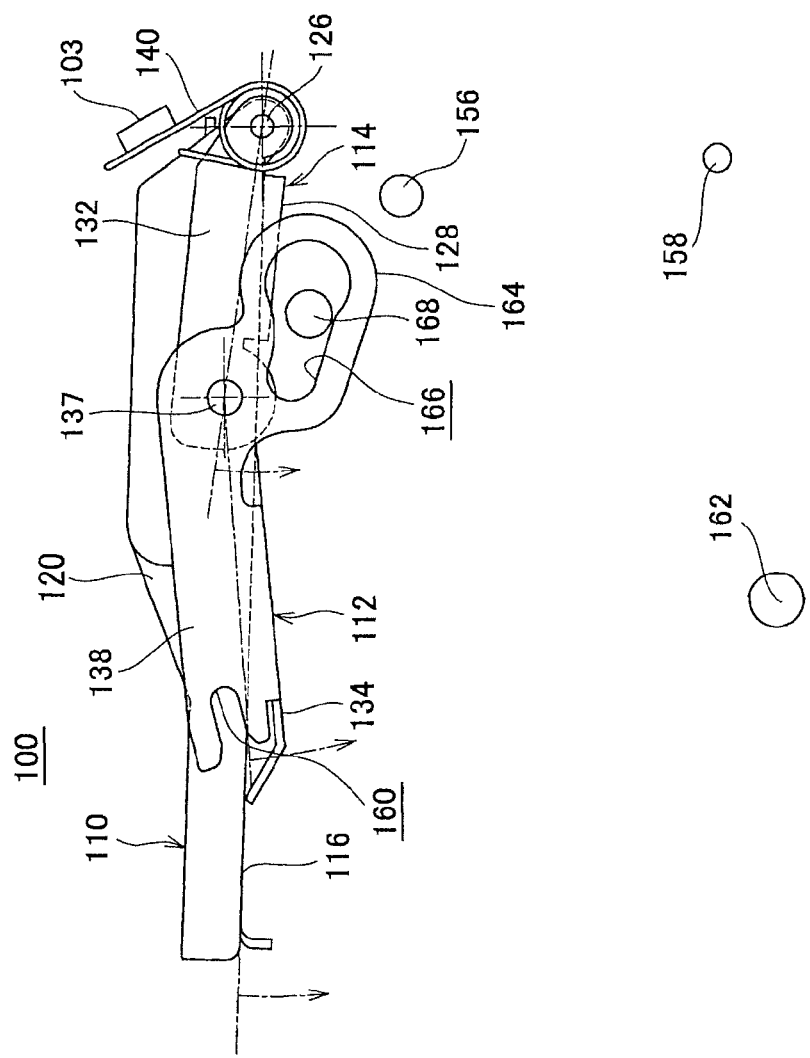
FIG. 8B is a side view as seen from the left side of a photographer of the mirror unit 100 in the mirror-up state.

FIG. 8A is a side view as seen from the right side of a photographer of the mirror unit 100 in the mirror-up state, and FIG. 8B is a side view as seen from the left side of a photographer of the mirror unit 100 in the mirror-up state. As shown in FIGS. 8A and 8B, in this state, the bias of the torsion coil spring 142 causes the boss 146 of the auxiliary frame 114 to exert pressure on the top surface of the mirror-up lever 154. Furthermore, the bias of the torsion coil spring 140 causes the cam 150 of the main frame 110 to exert pressure on the top surface of the mirror-up lever 154. As a result, the main frame 110 and the auxiliary frame 114 are stopped in a state of vertically overlapping each other.

The bias of the toggle spring 148 causes the base part 134 of the sub-frame 112 to exert pressure on the base part 116 of the main frame 110. As a result, the main frame 110 and the sub-frame 112 are stopped in a state of vertically overlapping each other.

Figure 9A:
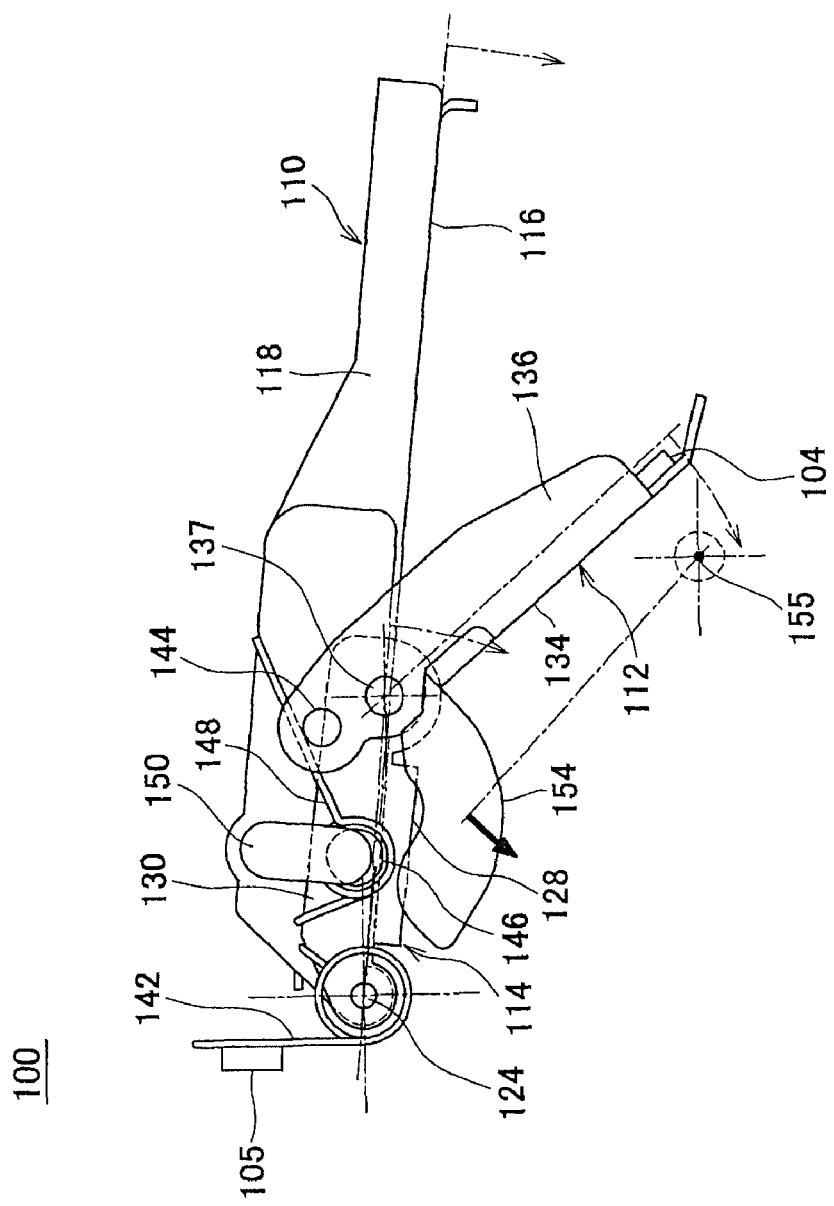
FIG. 9A is a side view as seen from the right side of a photographer of the mirror unit 100 when a mirror-down operation is performed.

FIG. 9A is a side view as seen from the right side of a photographer of the mirror unit 100 when a mirror-down operation is performed, and FIG. 9B is a side view as seen from the left side of a photographer of the mirror unit 100 when a mirror-down operation is performed. As shown in FIGS. 9A and 9B, when the mirror-down operation is begun for the mirror unit 100, the mirror-up lever 154 is lowered. Next, the auxiliary frame 114 and the main frame 110 are lowered by the bias of the torsion coil springs 142 and 140 exerting pressure on the mirror-up lever 154. Furthermore, the cam groove 166 and the cam pin 168 cause the auxiliary frame 114 to rotate in the down direction on the coupling axle 137. The bias direction of the toggle spring 148 then changes to the down direction on the coupling axle 137.

Figure 10A:
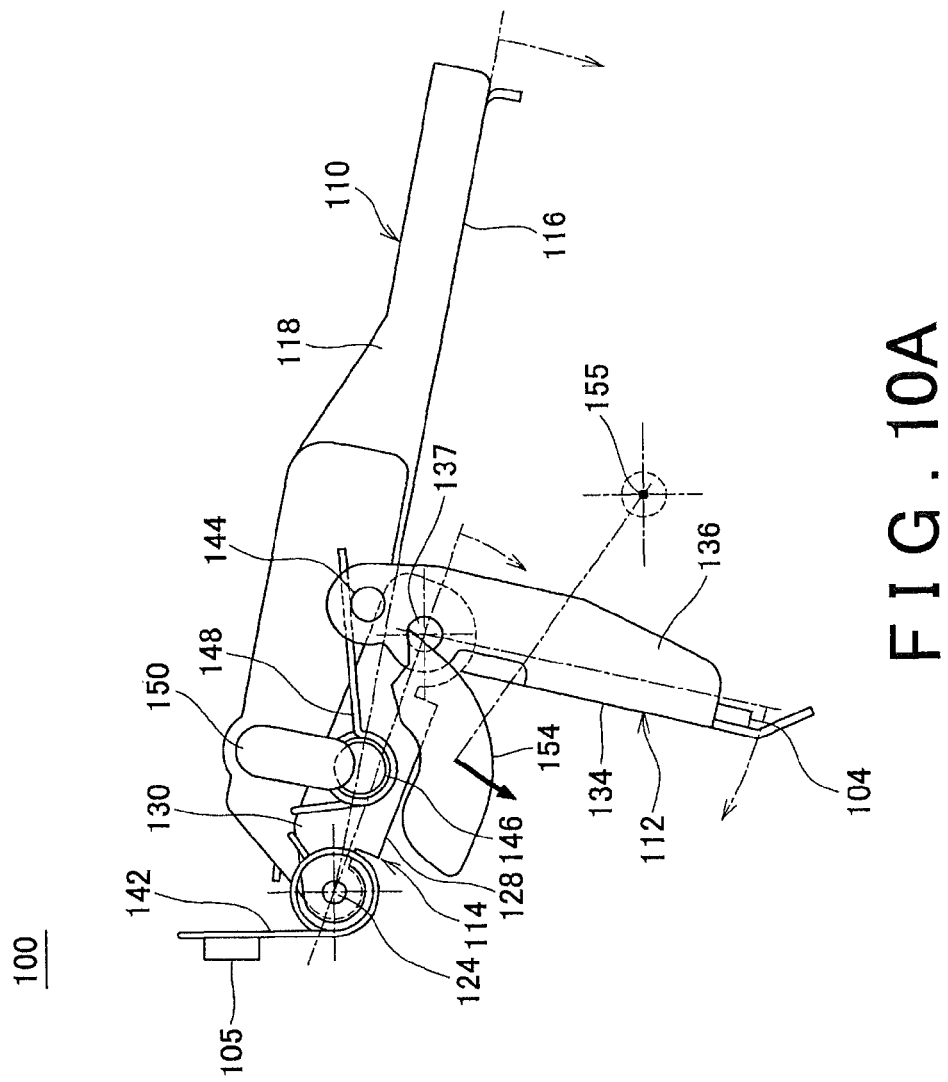
FIG. 10A is a side view as seen from the right side of a photographer of the mirror unit 100 when a mirror-down operation is performed.
Figure 10B:
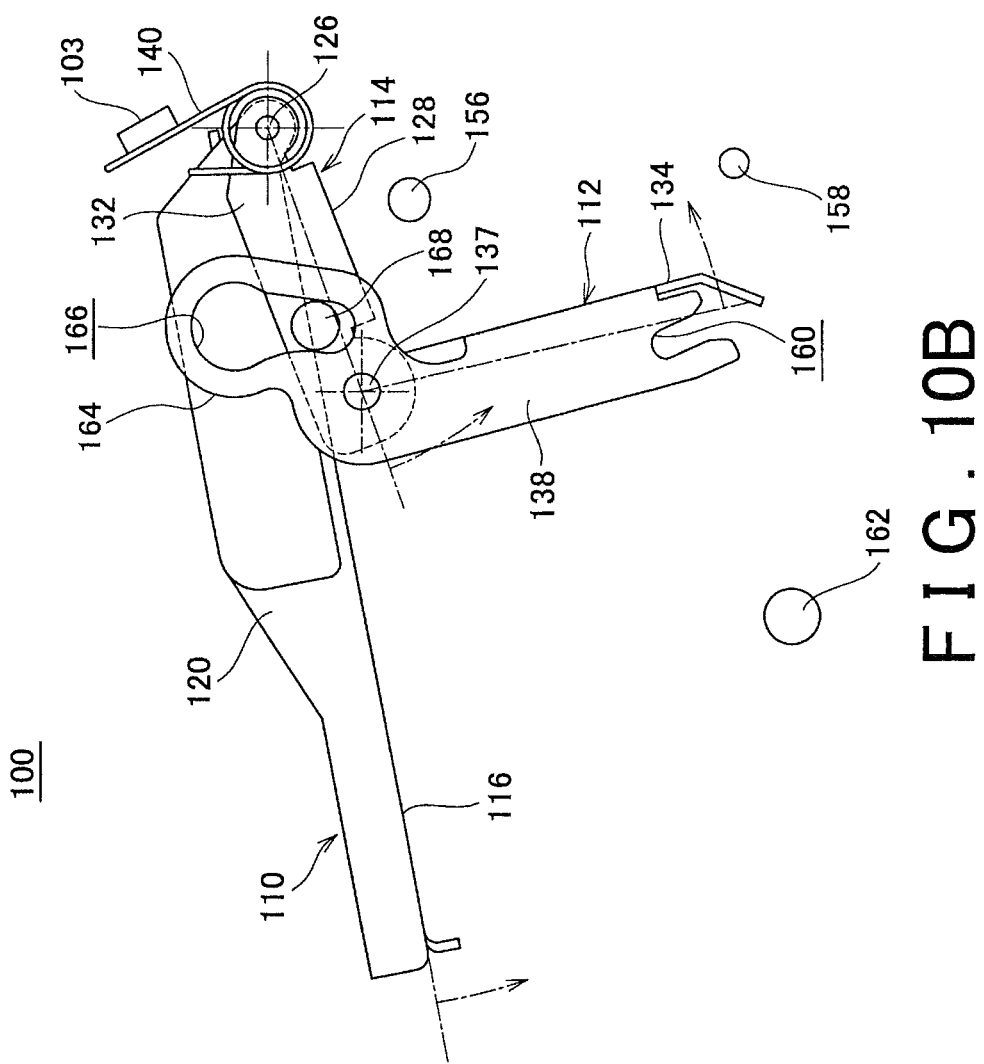
FIG. 10B is a side view as seen from the left side of a photographer of the mirror unit 100 when a mirror-down operation is performed.

FIG. 10A is a side view as seen from the right side of a photographer of the mirror unit 100 when a mirror-down operation is performed, and FIG. 10B is a side view as seen from the left side of a photographer of the mirror unit 100 when a mirror-down operation is performed. As shown in FIGS. 10A and 10B, in this state, the auxiliary frame 114 rotates in the down direction, i.e. the auxiliary frame 114 is lowered, due to its own weight, the weight of the sub-frame 112, and the bias of the torsion coil spring 142. The sub-frame 112 rotates in the down direction due to its own weight and the bias of the toggle spring 148. The main frame 110 rotates in the down direction, i.e. the main frame 110 is lowered, by its own weight and the bias of the torsion coil spring 140.

Here, the length of the auxiliary frame 114 from the shafts 124 and 126 to the outer end in the rotational radial direction is less than the length of the main frame 110 from the shafts 124 and 126 to the outer end in the rotational radial direction. As a result, the moment of inertia of the auxiliary frame 114 is less than the moment of inertia of the main frame 110. The spring constants of the torsion coil springs 140 and 142 are set such that the rotational speed of the auxiliary frame 114 in the down direction is greater than the rotational speed of the main frame 110 in the down direction. Accordingly, when the mirror-down operation is performed for the mirror unit 100, the auxiliary frame 114 begins rotating in the down direction earlier than the main frame 110.

Figure 11A:
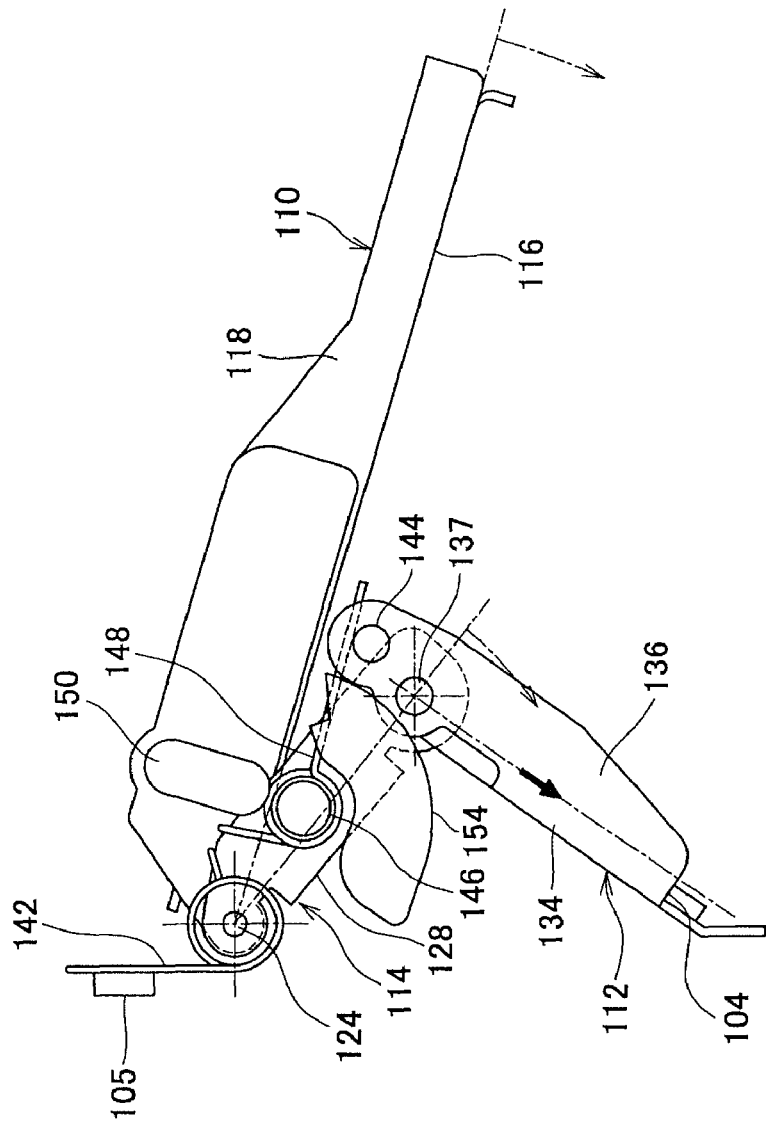
FIG. 11A is a side view as seen from the right side of a photographer of the mirror unit 100 when a mirror-down operation is performed.
Figure 11B:
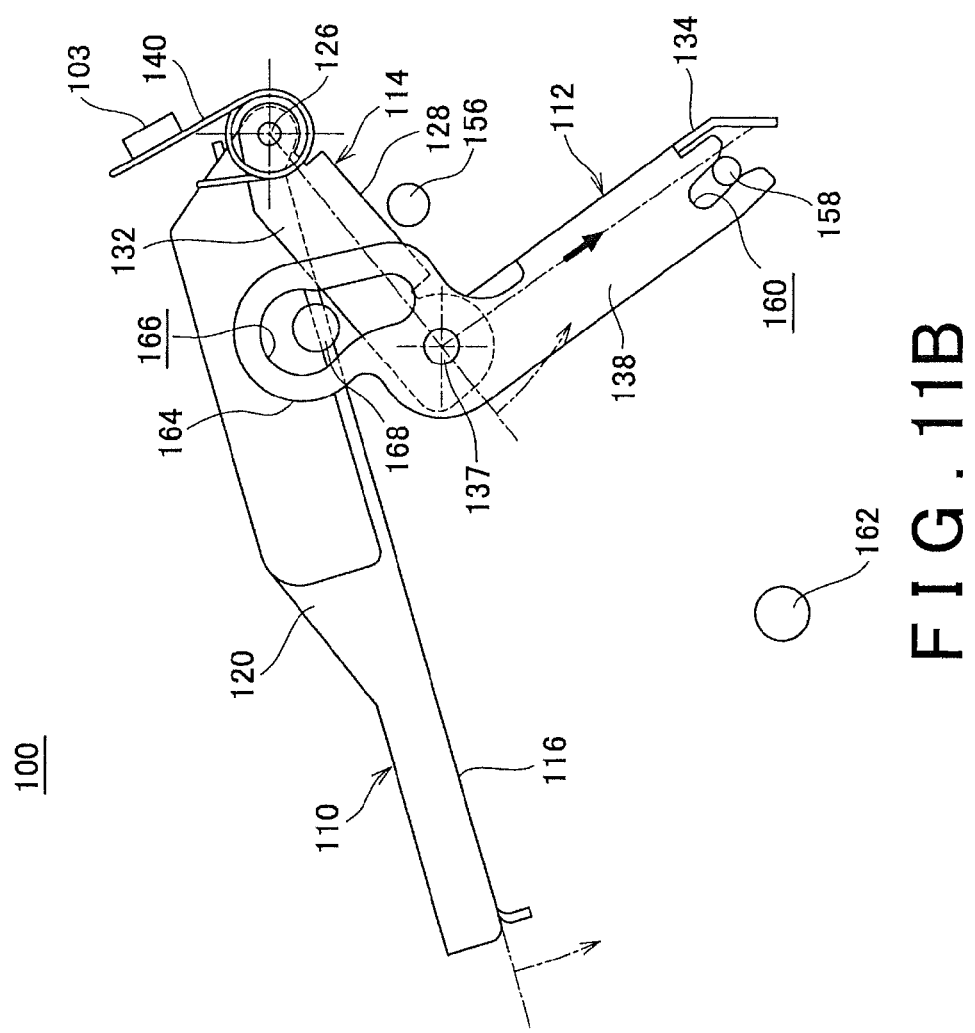
FIG. 11B is a side view as seen from the left side of a photographer of the mirror unit 100 when a mirror-down operation is performed.

FIG. 11A is a side view as seen from the right side of a photographer of the mirror unit 100 when a mirror-down operation is performed, and FIG. 11B is a side view as seen from the left side of a photographer of the mirror unit 100 when a mirror-down operation is performed. As shown in FIGS. 11A and 11B, the positioning pin 158 is engaged with the U-shaped groove 160 of the sub-frame 112 prior to the auxiliary frame 114 contacting the positioning pin 156.

Figure 12A:
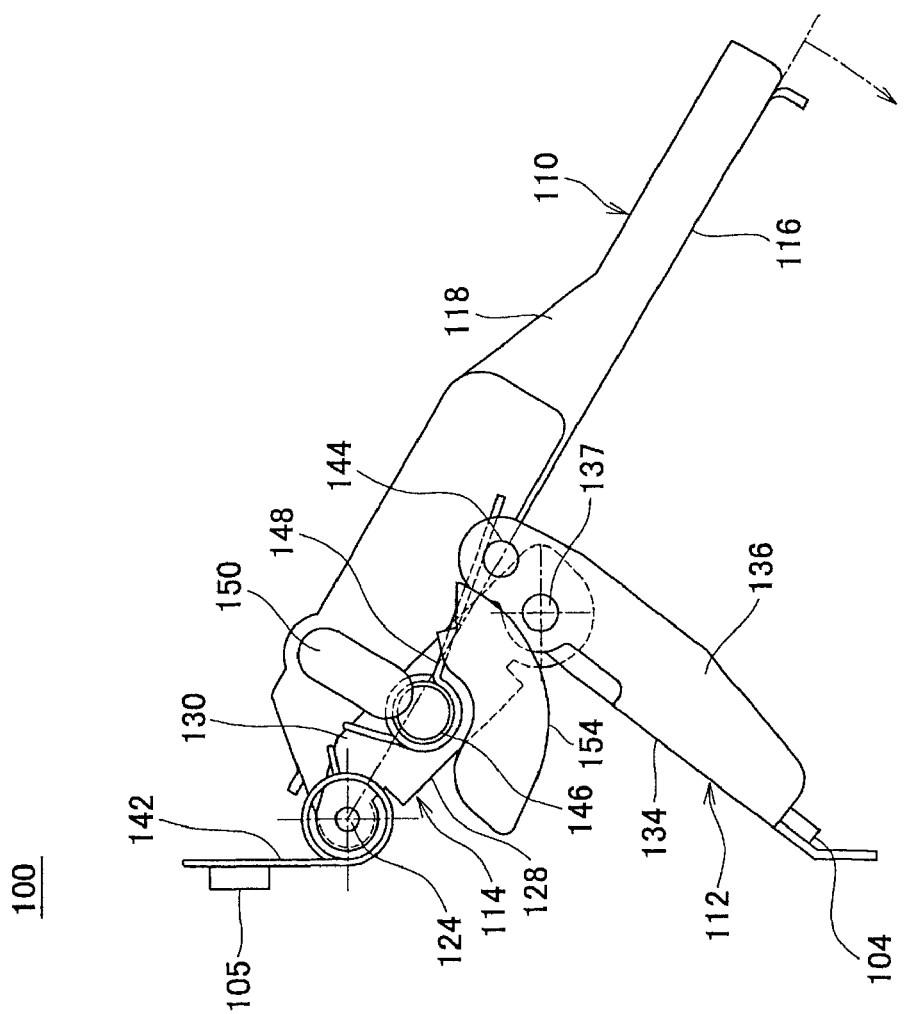
FIG. 12A is a side view as seen from the right side of a photographer of the mirror unit 100 when a mirror-down operation is performed.
Figure 12B:
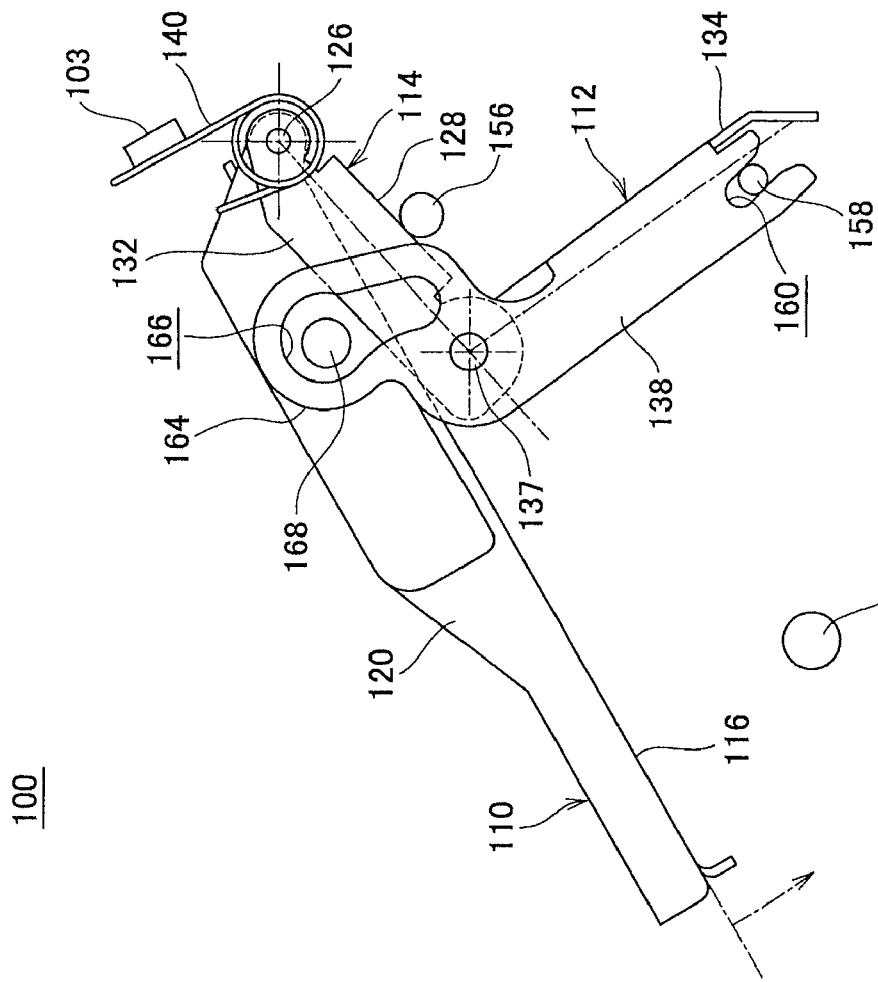
FIG. 12B is a side view as seen from the left side of a photographer of the mirror unit 100 when a mirror-down operation is performed.

FIG. 12A is a side view as seen from the right side of a photographer of the mirror unit 100 when a mirror-down operation is performed, and FIG. 12B is a side view as seen from the left side of a photographer of the mirror unit 100 when a mirror-down operation is performed. As shown in FIGS. 12A and 12B, the auxiliary frame 114 rotates in the down direction due to its own weight, the weight of the sub-frame 112, and the bias of the torsion coil spring 142. As a result, the auxiliary frame 114 comes into contact with the positioning pin 156, and the positioning pin 158 enters deeply into the U-shaped groove 160. In this state, the bias of the torsion coil spring 142 causes the auxiliary frame 114 to exert pressure on the positioning pin 156, and the bias of the toggle spring 148 causes the sub-frame 112 to exert pressure on the positioning pin 158. As a result, the auxiliary frame 114 and the sub-frame 112 are stopped in the down position.

On the other hand, the main frame 110 rotates in the down direction, due to its own weight and the bias of the torsion coil spring 140, later than the auxiliary frame 114. The main frame 110 then contacts the positioning pin 162. In this state, the bias of the torsion coil spring 140 causes the main frame 110 to exert pressure on the positioning pin 162. As a result, the main frame 110 stops in the down position.

After the main frame 110, the sub-frame 112, and the auxiliary frame 114 reach the down position, vibrate vibration is caused by elastic vibration of the torsion coil springs 140 and 142 and the toggle spring 148. In other words, the main frame 110, the sub-frame 112, and the auxiliary frame 114 bounce upon reaching the down position.

Here, the sub-mirror 104 held by the sub-frame 112 guides the incident light to the distance measuring sensor disposed therebelow, but when the sub-mirror 104 bounces, the length of the optical path and direction of the optical axis of the incident light directed toward the distance measuring sensor changes, thereby preventing accurate distance measurement. Therefore, it is necessary to wait for the sub-mirror 104 to stop bouncing before beginning the distance measurement.

If the time from when the mirror-down operation begins to when the sub-mirror 104 stops bouncing can be shortened so that the distance measurement can begin earlier, the number of images that can be captured per unit time during continuous image capturing can be increased.

In the mirror unit 100 of the present embodiment, the auxiliary frame 114 and the sub-frame 112 are lowered to the down position independently from the main frame 110, and therefore the bouncing of the main frame 110 does not affect the sub-mirror 104. Accordingly, the distance measurement can be begun without waiting for the bouncing of the main frame 110 to stop.

In particular, since the rotational radius of the auxiliary frame 114 in the mirror unit 100 of the present embodiment is less than the rotational radius of the main frame 110, the moment of inertia of the auxiliary frame 114 is less than the moment of inertia of the main frame 110. Furthermore, the spring forces of the torsion coil springs 140 and 142 are set such that the rotational speed of the main frame 110 in the down direction does not exceed the rotational speed of the auxiliary frame 114 in the down direction. Yet further, the auxiliary frame 114 is arranged further downward in the direction of the lowering than the main frame 110, and so the auxiliary frame 114 can rotate in the down direction independently from the main frame 110.

Since the auxiliary frame 114 and the sub-frame 112 move to the down position prior to the main frame 110, as described above, the time from when the mirror-down operation begins to when the sub-mirror 104 stops bouncing is shortened. Accordingly, the distance measurement can be begun earlier and the number of images that can be captured per unit time during continuous image capturing can be increased.

With the mirror unit 100 of the present embodiment, the mirror-up lever 154 contacts the boss 146 that is provided on the auxiliary frame 114 and the cam 150 provided on the main frame 110. As a result, the main mirror 102 and the sub-mirror 104, which move independently from each other during the mirror-up and mirror-down operations, can be driven by a shared mirror driving mechanism. Accordingly, an increase in the cost of the mirror driving mechanism is prevented.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention. For example, the embodiments described the main frame 110 and the auxiliary frame 114 as being rotatable on the same axis, but the main frame 110 and the auxiliary frame 114 may instead be arranged to be rotatable on separate rotational axes that are parallel to each other.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. A mirror unit comprising:
    a first mirror that reflects and passes incident light from a subject side;
    a second mirror that reflects the incident light passed by the first mirror;
    a first mirror holder that holds the first mirror, is rotatable on a rotational axis arranged above an optical path of the incident light, is lowered to a first mirror-down position in which the first mirror is inserted into the optical path of the incident light, and is raised to a first mirror-up position in which the first mirror is removed from the optical path of the incident light; and
    a second mirror holder that includes an auxiliary component and a mirror holding component holding the second mirror, is lowered to a second mirror-down position in which the second mirror is inserted into the optical path of the incident light, and is raised to a second mirror-up position in which the second mirror is removed from the optical path of the incident light, wherein
    the auxiliary component is provided below the first mirror holder in the direction of the lowering, is rotatable on a rotational axis that is the same as or parallel to the rotational axis of the first mirror holder, and can be lowered independently of the first mirror holder,
    the mirror holding component is engaged with the auxiliary component to be relatively rotatable around a rotational axis that is parallel to the rotational axis of the auxiliary component, and
    the second mirror holder is lowered from the second mirror-up position to the second mirror-down position prior to the first mirror holder being lowered from the first mirror-up position to the first mirror-down position.

2. The mirror unit according to claim 1, wherein the auxiliary component and the first mirror holder are rotatable on the same axis.

3. The mirror unit according to claim 1, further comprising:
    a first contact member provided on the first mirror holder;
    a second contact member provided on the auxiliary component; and
    a pushing component that contacts the first contact member and the second contact member to be moved upward by the first contact member and the second contact member, thereby pushing the first mirror holder to the first mirror-up position and pushing the second mirror holder to the second mirror-up position.

4. The mirror unit according to claim 1, wherein a rotational radius of the auxiliary component is less than a rotational radius of the first mirror holder.

5. The mirror unit according to claim 1, comprising:
a first biasing member that biases the first mirror holder in a direction of the lowering; and
a second biasing member that biases the auxiliary component in the direction of the lowering to lower the auxiliary component more quickly than the first mirror holder.

6. An image capturing apparatus comprising:
the mirror unit according to claim 1;
an image capturing unit that is arranged in the optical path of the incident light; and
a distance measuring sensor that receives the incident light reflected by the second mirror.

\* \* \* \* \*

UNITED STATES PATENT AND TRADEMARK OFFICE
CERTIFICATE OF CORRECTION

| | | |
|---|---|---|
| PATENT NO. | : 8,235,606 B2 | Page 1 of 1 |
| APPLICATION NO. | : 13/158076 | |
| DATED | : August 7, 2012 | |
| INVENTOR(S) | : Toshiaki Kurahashi | |

It is certified that error appears in the above-identified patent and that said Letters Patent is hereby corrected as shown below:

On the Title Page, Under Item (30) Foreign Application Priority Data, insert
        -- Jan. 26, 2009 (JP) 2009-014052 --, therefor.

Signed and Sealed this
Second Day of April, 2013

Teresa Stanek Rea
*Acting Director of the United States Patent and Trademark Office*